United States Patent Office 3,512,804
Patented May 19, 1970

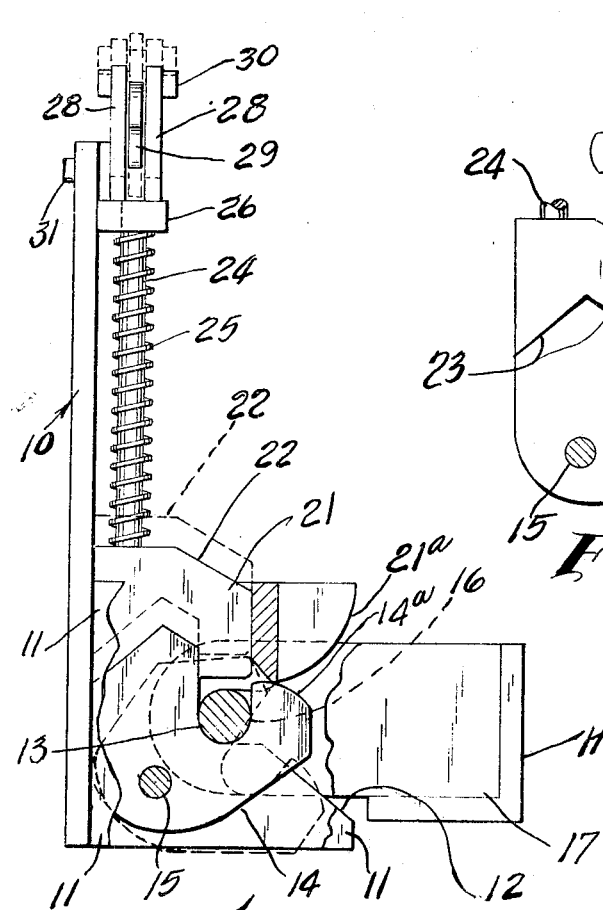
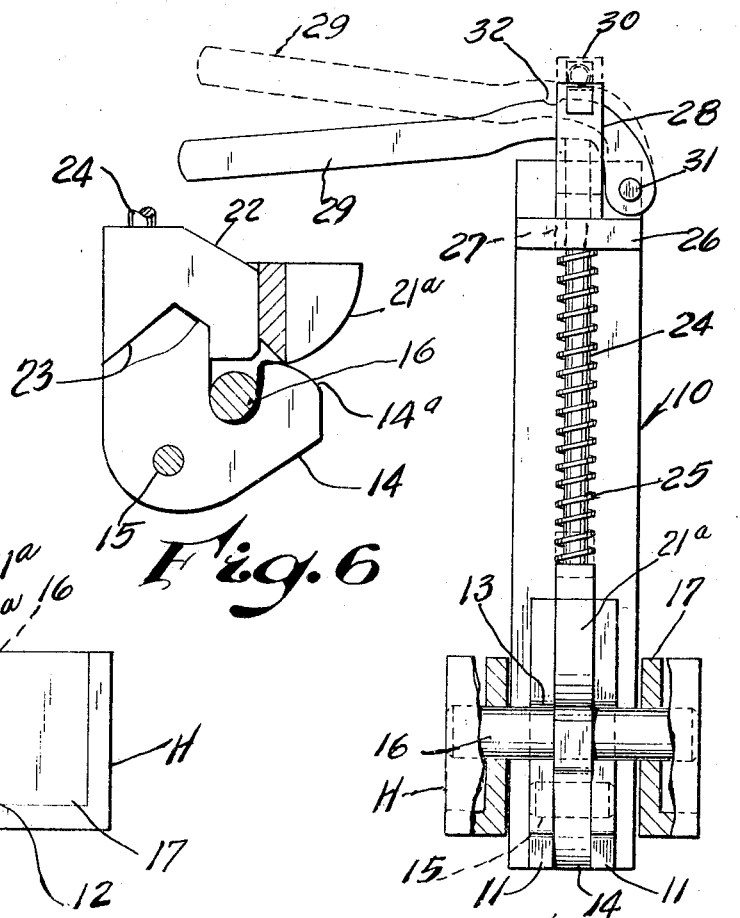
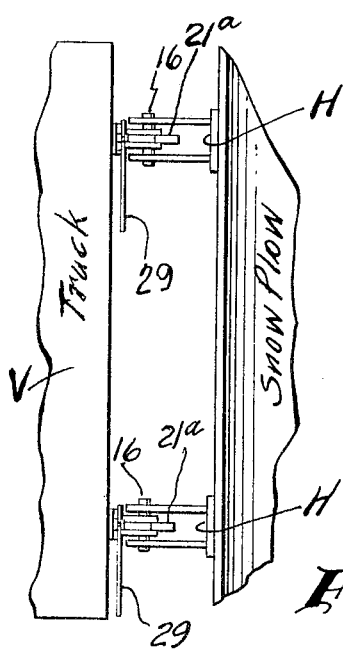
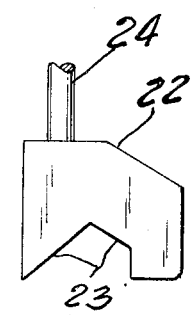
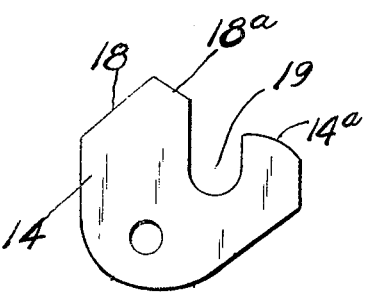

3,512,804
LOCK AND HITCH ASSEMBLY
Arnold Siegert, Hubbard Lake, Mich. 49747
Filed Dec. 15, 1967, Ser. No. 690,840
Int. Cl. B60d 1/04
U.S. Cl. 280—509         8 Claims

ABSTRACT OF THE DISCLOSURE

This invention relates generally to a quick connect and disconnect hitch for securing an implement, such as a snow-plow, to a power vehicle and specifically relates to a quickly operable means for connecting and/or disconnecting a snow-plow or the like to or from a power vehicle.

---

One of the prime objects of the invention is to provide a simple, practical and economical hitch mechanism which requires but one workman to connect or disconnect a snow-plow from a truck or other power vehicle, and which can be readily manufactured and assembled.

Another object of the invention is to provide connection means whereby the snow-plow is maintained in approximately working position when detached so that it can be readily mounted on another vehicle when required.

A further object still is to provide means having sufficient flexibility to permit the snow-plow or other implement to operate over rough roads and other uneven surfaces.

Still a further object is to design a hitch mechanism which is safely operable, and releases only when the lever is swung to raised release position.

A further object of the invention is the provision of a novel form of hitch of the character described which is capable of being used as a means for pushing or pulling the attached mechanism and permitting free relative rocking movement thereof as it travels over uneven surfaces.

With the above and other subjects in view, the present invention consists in the combination and arrangement of parts, hereinafter more fully described, illustrated in the accompanying drawings, and more particularly pointed out in the appended claims, it being understood that changes may be made in the form, size, proportion and minor details of construction, without departing from the spirit or sacrificing any of the advantages of the invention.

In the drawing:

FIG. 1 is a side elevational view of the hitch and locking mechanism, parts being broken away to more clearly show the construction, the broken lines showing the locking member in locked position.

FIG. 2 is a front elevational view with parts broken away to more clearly show the construction.

FIG. 3 is a detail side elevational view of the locking member.

FIG. 4 is a top plan view showing the mechanism attached to a snow-plow.

FIG. 5 is a detail side elevational view showing the locking mechanism.

FIG. 6 is an enlarged, side elevational view of the jaw locking means and locking member assembly.

Referring now to the drawing in which I have shown the preferred embodiment of my invention. The numeral 10 indicates a vertically disposed bracket adapted to be secured to a power vehicle for hitching to a snow-plow of conventional design in any desired manner, the lower end of said bracket being formed with forwardly projecting transversely spaced apart side plates 11 secured to or formed integral with the lower end of the bracket, the lower free end sections of the side plates being upwardly angled as at 12 and lead into semi-circular passages 13 provided in the side plates 11.

The locking member 14 is interposed between the side plates 11 and is rockably connected thereto by means of the pin 15. The upper front ends of the side plates 11 are provided with an upwardly curved face 21a which is disposed directly over the jaw 14a of the locking member 14, and when locking the hitch assembly, the hitch pin 16 bears against the curved face of the side plates, 11, and the curved jaw section 14a of the locking member 14 which accommodates the pin 16 and locks the snow-plow to the truck, and it will be obvious that the unit can be used in either vertical, horizontal, or any position as desired. The upper edge 18 of the locking member 14 is recessed as at 19 to accommodate the pin 16.

An opening 21, of predetermined size, is provided between the upper ends of the side plates 11, and the jaw locking section 22 (see FIG. 5 of the drawing) is disposed between the side plates 11 and is formed with angularly disposed cam walls 23, engageable with the section 18 and 18a of the locking member 14. A rod 24 is connected to the locking means 22, and a spring 25 is provided thereon and is interposed between the jaw locking means 22 and a stop 26, provided on the bracket 10. The force exerted by the spring 25 biases locking means 22 downwardly tending to retain locking means 22 in the position shown in FIG. 1. The rod 24 is readily slidable in the opening 27 provided in said stop 26 and is connected to spaced apart plates 28 provided on the upper end of the rod 24 which accommodates a handle 29 therebetween, and a bolt 30 connects the upper ends of the plates 28, as shown. One end of handle 29 is downwardly curved for pivotal connection with the pin 31 provided on the upper end of the bracket 10, the free end of said handle projecting between the plates 28 which forms an extension of the rod 24, and is formed with a seat 32 in the upper edge thereof for engagement with the bolt 30 to hold the mechanism 22 in its raised position, and when the jaw locking means is released the handle swings down to yieldably hold the jaw in locked position.

This mechanism is designed to be readily connectable to and releasable from a snow-plow or similar appliance. To connect, it is merely a matter of driving and guiding the power vehicle V so that the lock pins 16 engage the wall section 14a of the mechanism, and the device is then readily connected. To disconnect the hitch it is merely necessary to swing the handles 29 up, raise the jaw locking means 14, and the snow-plow is then readily disconnectable; a sharp push or pull is all that is necessary to connect or disconnect.

From the foregoing description it will be obvious that I have perfected a simple, practical and economical mechanism in which the invention is designed to be readily connectable to or releasable from a snow-plow or other apparatus, and while I have in the above description disclosed a practical and efficient embodiment of my invention, it should be understood that I do not wish to be limited thereto, as the mechanism is capable of numerous changes and modifications.

What I claim is:
1. A hitch device comprising:
   a bracket;
   at least one longitudinally extending side plate mounted on said bracket;
   a locking member pivotally mounted about a transversely extending pivot means on said side plate and adapted for movement between a locked position and a removed, unlocked position, said locking member having an initially rearwardly extending recess in said unlocked position adapted to receive a hitch pin;

movable locking means engageable with said locking member for securing it in said locked position;

said locking member and said locking means including cooperating cam surfaces extending forwardly of said pivot means;

said side plate including a cut away pin receiving portion adapted to receive said pin when said locking member is in said locked position.

2. A hitch device comprising:

a bracket;

at least one side plate mounted on said bracket;

hitch pin receiving means pivotably mounted about a pivot means on said side plate and adapted for movement between locked and unlocked positions;

locking means engageable with said hitch pin receiving means for securing it in said locked position;

means for biasing said locking means and hitch pin receiving means into engagement;

said hitch pin receiving means including first and second oppositely inclined guide surfaces cooperating with said locking means to guide the hitch pin receiving means between the unlocked and the locked positions.

3. A hitch device as set forth in claim 2 wherein said first and second inclined surfaces are of differing lengths.

4. A hitch device as set forth in claim 2 wherein said locking means includes oppositely inclined surfaces complementally formed with the guide surfaces of said hitch pin receiving means.

5. A hitch device as set forth in claim 2 wherein said locking means includes:

means movable from a locking position to a position engageable with said first inclined surface when said hitch pin receiving means is in the unlocked position and with said second inclined surface when said hitch pin receiving means is moving to said locked position.

6. A hitch device as set forth in claim 5 including manually operated means for moving said means engageable with said inclined surfaces from said locking position to a position engageable with said second inclined surface.

7. A hitch device as set forth in claim 2 wherein said first and second guide surfaces are inclined, respectively, downwardly forwardly and rearwardly from a position above said pivot means when said hitch pin receiving means is in the locked position.

8. A hitch device as set forth in claim 7 further including pin guide surface means disposed above said hitch pin receiving means and fixed to said side plates.

References Cited

UNITED STATES PATENTS

| | | | |
|---|---|---|---|
| 2,014,963 | 9/1935 | Coder | 280—509 |
| 2,437,607 | 3/1948 | Kuchar | 280—509 |
| 2,979,137 | 4/1961 | Hess | 280—510 |
| 3,214,138 | 10/1965 | Jocher et al. | |

FOREIGN PATENTS

| | | |
|---|---|---|
| 834,531 | 8/1938 | France. |
| 432,554 | 7/1935 | Great Britain. |

LEO FRIAGLIA, Primary Examiner

U.S. Cl. X.R.

280—460, 481